United States Patent [19]
Ceintrey

[11] 4,318,937
[45] Mar. 9, 1982

[54] HEAT AND SOLVENT SENSITIVE RECORDING MATERIAL AND PROCESS TO USE IT

[75] Inventor: Claude Ceintrey, Neuville les Dieppe, France

[73] Assignee: Rhone-Poulenc Systemes, Creteil, France

[21] Appl. No.: 196,078

[22] Filed: Oct. 10, 1980

Related U.S. Application Data

[63] Continuation-in-part of Ser. No. 912,546, Jun. 2, 1978, Pat. No. 4,252,601.

[51] Int. Cl.[3] .......................... B05B 5/00; B05D 3/06; B32B 3/10; G01D 9/00

[52] U.S. Cl. .................................. 427/56.1; 156/655; 346/1.1; 346/135.1; 427/161; 427/273; 427/336; 428/46; 428/483; 525/239; 525/240

[58] Field of Search .............. 427/161, 273, 336, 56.1; 106/19, 311; 266/214, 215; 252/79.1, 364; 346/1.1, 135.1; 156/655; 430/337, 338; 525/239, 240; 428/46, 483

[56] References Cited

U.S. PATENT DOCUMENTS

| | | | |
|---|---|---|---|
| 2,962,382 | 11/1960 | Ives | 428/918 X |
| 3,014,301 | 12/1961 | Grupe | 428/918 X |
| 3,180,752 | 4/1965 | Bollinger et al. | 428/918 X |
| 3,424,706 | 1/1969 | Smith et al. | 525/239 X |

*Primary Examiner*—Michael R. Lusignan
*Attorney, Agent, or Firm*—Sherman & Shalloway

[57] ABSTRACT

An opaque recording material has an opaque sensitive layer which can be transparentized by application of heat or a suitable solvent for the opacifying styrene resin pigment which is dispersed in a polyvinylidene chloride film-forming resin binder. In a particular application, useful for overhead transparencies or for making photographic negatives for reproduction, heat and solvent are both applied to the opaque layer in selected different areas to transparentize the opaque layer. The opaque layer may be deposited on a transparent clear or colored support such as transparent polyester.

18 Claims, No Drawings

HEAT AND SOLVENT SENSITIVE RECORDING MATERIAL AND PROCESS TO USE IT

RELATED APPLICATION

This application is a continuation-in-part of Ser. No. 912,546 filed June 2, 1978, now U.S. Pat. No. 4,252,601, issued on Feb. 24, 1981.

BACKGROUND OF THE INVENTION (1) Field of the Invention

This invention relates to heat and solvent sensitive recording materials on which information can be recorded to make transparencies for projection of information or for making photographic negatives for reproduction and to the process for making transparencies for recording or reproduction using the recording materials.

More particularly, the invention relates to heat and solvent sensitive recording materials of the type in which an opaque layer is coated on a transparent support and in which the opaque layer can be transparentized by writing on the opaque layer with a solvent for the pigment component of the opaque layer or by application of heat to the opaque layer.

(2) Discussion of the Prior Art

U.S. Pat. No. 3,014,301 to W. Grupe relates to a recording material referred to as recording chart or chart medium, for use in recording units with a heated or a pressure stylus, and/or a pen containing a solvent. The chart medium is made with a transparent film backing upon which is deposited a white, opaque coating which is heat, pressure and solvent sensitive. The coating is formed from an unstable solution of nitrocellulose in acetone (a solvent) and zylol (a non-solvent). The whiteness and opacity results from the acetone evaporating first leaving a high percentage of xylol and nitrocellulose in solution, from which the nitrocellulose is precipitated as a white solid. The chart is transparentized by "printing" the opaque layer with a solvent such as Cellosolve or carbitol acetate from a solvent dispensing pen. A transparent dye can be added to the solvent to form transparent lines color-dyed but photographically transparent so that it may be used as a negative for photographic reproduction or as a positive transparency for projection onto screens or other medium. The chart medium can be used, for example, for preparing graphs with conventional pen-operated machines.

A similar sheet recording material which is sensitive to pressure is disclosed by R. S. Ives in U.S. Pat. No. 2,962,382, except that water replaces xylol as the high boiling non-solvent and various film-forming polymeric materials such as cellulose acetate, ethyl cellulose and polyethyl methacrylate are disclosed in addition to nitrocellulose as the opaque material. This patent also discloses methyl ethyl ketone and methyl alcohol, in addition to acetone as suitable volatile solvents for the polymeric materials. However, the opaque coatings taught by Ives require large amounts of surfactant or a combination of surfactant and waxy lubricant to produce useful pressure-sensitive materials.

Other related heat, solvent and/or pressure sensitive recording papers are described in U.S. Pat. No. 2,299,991—W. F. Kallock; U.S. Pat. No. 3,147,062—W. E. Glenn, Jr.,; U.S. Pat. No. 3,265,524—I. P. Echeagaray; U.S. Pat. No. 3,180,752—A. E. Bollinger, et al., U.S. Pat. No. 3,320,089—E. G. Bourgeois; U.S. Pat. No. 3,642,475—Vraneken, et al.

While the recording materials described in the above patents provide satisfactory transparencies, in many cases they suffer from the drawback that it is very difficult to obtain uniform opaque coatings by depositing a layer of polymeric material from an unstable mixture of volatile solvent and high-boiling nonsolvent. Precise control of the rate of evaporation of the volatile solvent is necessary to obtain opaque coatings and uniformity to the opacity over the entire surface. Reproducibility from sheet to sheet is also difficult. Furthermore, the degree of opacity with the polymer/solvent/non-solvent systems of these patents is generally not as high as desireable for good contrast between the transparent film backing sheet and the opaque coating layer.

In the applicant's copending application Ser. No. 912,546, novel opaque coatings are described that can be prepared from an aqueous dispersion of finely divided particles of a styrene resin with a transparent film-forming binder, particularly, polyvinylidene chloride (PVDC) and that when such an opaque coating is deposited on a transparent backing sheet, positive transparencies for projection of images of the transparent "writing"or negative transparencies for photographic reproduction can be obtained by application of a solvent for the styrene resin particles (pigment) to the opaque coating. The prior application is directed to an information recording kit for making transparencies for projection of information or for making photographic negatives for reproduction, the kit including the opaque recording material (film), writing liquid (solvent) and writing means (e.g., pen), whereby when writing liquid is applied to the opaque layer, according to a pattern of information, the opaque layer becomes photographically transparent (transparent to visible light) according to the pattern. The prior application is also directed to a method for writing (recording information) for projection, display or reproduction by transparentizing the film by applying the writing solvent to the opaque layer.

The prior application also taught to incorporate one or more fluorochloroalkanes having boiling points greater than 0° C. to the writing liquid to overcome problems associated with toxicity, flammablility, and malodor of typical solvents for the styrene resin opacifying pigment particles, as well as, in many cases, to improve the effectiveness, e.g., speed, of the writing liquid.

While satisfactory transparencies are available on the market, they are limited to the heat-sensitive type using a heat recording apparatus and special originals with the image zones capable of absorbing infrared light. Furthermore, known heatsensitive recording materials, such as sold by the Minnesota Mining and Manufacturing Company (3M) under the designation "Thermofax Transparency 528", give transparencies whose transparent zones have a too high haze value (as defined below) for some applications. When using such known transparencies with a writing liquid, the traces obtained are so bad that in practice they cannot be used with a solvent writing means.

Furthermore, such materials cannot be used successively with heat and solvent. When used with the "Thermofax Secretary 45" of the 3M Company, the original is placed on the top of the transparencies, in intimate contact with the sensitive coating. To have a readable image, the opaque coating must be placed on the overhead projector with the transparent backing sheet facing the operator. It is, thus, impossible to write on this material during the projection on the screen.

SUMMARY OF THE INVENTION

It has now been found that the opaque coatings as previously described, which are prepared from an aqueous dispersion of finely divided particles of a styrene resin pigment uniformly distributed throughout a polyvinylidene chloride film forming resin binder, when deposited on a transparent backing sheet can be used to obtain positive transparencies for projection of images of the transparent "writing" or negative transparencies for photographic reproduction by application of heat, as well as by application of a solvent for the styrene resin particles, to the opaque coating.

Accordingly, the present invention provides, in one aspect, an opaque recording material for making transparencies for projection of information or for making photographic negatives for reproduction, comprising a transparent support coated with an opaque layer obtained from a mixture of an organic styrene resin pigment emulsion and a polyvinylidene chloride film forming resin binder emulsion.

In another aspect, the invention provides a process for making transparencies for projection of information or for making photographic negatives for reproductions, by applying heat to the surface of an opaque recording material which comprises a transparent backing coated with an opaque layer comprising a finely divided particulate organic styrene resin pigment uniformly distributed throughout a polyvinylidene chloride film forming resin binder, the amount of heat being sufficient to raise the temperature of the opaque layer above the transparentizing temperature of the opaque layer.

In a further embodiment of the invention process, the opaque recording material is transparentized by both heat and solvent applied consecutively in either order, preferably heat, then solvent. In accordance with this aspect of the invention, the opaque recording material is first transparentized by heating the material to above the transparentizing temperature of the opaque layer and then by writing on the remaining opaque portions of the opaque layer with a writing liquid containing a solvent for the opacifying styrene resin pigment particles dispersed in the polyvinylidene chloride resin film-forming binder.

According to the preferred mode of carrying out this embodiment of the invention process, an original having infrared absorbing zones and non-infrared absorbing zones thereon is reproduced by placing the original in contact with the transparent backing of the opaque recording material and exposing the original to infrared irradiation whereby the infrared absorbing zones will be heated and consequently the heat will be conducted through the transparent backing to the opaque recording material which will then become transparent in zones corresponding to the infrared absorbing zones of the original. Subsequently, the original and the copy thereof (transparentized opaque recording material) are separated. Additional information can be provided on the copy by writing on the remaining opaque zones—-corresponding to the noninfrared absorbing zones of the original—of the opaque layer of the recording material with a writing liquid containing a solvent for the opaque layer, and optionally, a transparent dye.

DETAILED DESCRIPTION OF THE INVENTION AND PREFERRED EMBODIMENTS

The opaque recording materials used in the information recording system of the present invention are formed from aqueous dispersion of styrene resins which are characterized by being non-film forming at under 65° C. (i.e., they have a minimum film-forming temperature—MFFT—of 65° C.) and having an average particle size in the range of about 0.2 to 1.0 micron. For average particle sizes under 0.2 micron, the degree of opacity of the opaque layer is insufficient. For average particle sizes greater than 1.0 micron, the particles tend to precipitate or drop out. Suitable aqueous dispersions of styrene resins meeting these critical requirements are commerically available from a variety of sources, and techniques for their preparation are well known in the art.

The styrene resin can be a polystyrene homopolymer or a copolymer of styrene with up to 30 percent by weight of one or more vinyl monomers which are copolymerizable with styrene, such as butadiene, acrylonitrile, acrylic acid, methacrylic acid, acrylic esters, e.g., ethyl acrylate and butyl acrylate, methacrylic esters, e.g., methyl methacrylate and ethyl methacrylate, and the like.

The other essential component of the opaque coating is the polyvinylidene chloride film-forming resin binder. Surprisingly, as shown by the comparative examples below, the combination of these two polymers, chosen among hundreds of possible combinations, gives very superior results.

The opaque layer is formed by mixing the aqueous dispersion of the finely divided styrene resin pigment with an aqueous dispersion of particles of the PVDC film-forming resin binder, depositing the mixture on the transparent backing sheet and drying under moderate temperature conditions which will allow the binder particles to form a film, but which will not allow the pigment particles to coalesce. The proportion of the pigment particles to the binder particles should be selected to provide an opaque layer whose degree of opacity is at least 60% as measured by a photovolt reflectometer. By "degree of opacity" is meant the percentage of visible light which will be absorbed by the layer. Accordingly, the opaque layers useful for this invention will transmit less than 40% of the total incident light. It is also essential that the transparent traces formed according to this invention have a degree of transparency of at least 90%, i.e., transmit 90% or more of incident visible light.

Preferably, the weight ratio of the styrene resin pigment to film-forming binder is about 1:1 to about 9:1. At less than about 50% of styrene resin pigment particles, the degree of opacity is insufficient, while at amounts of pigment particles in excess of 90% by weight, it is not possible to obtain a coating of satisfactory adherence to the transparent backing sheet.

Substantially any transparent backing sheet can be used for forming the recording material. The support film can be any transparent natural or synthetic material, such as polyethylene, polypropylene, cellulose acetate, polyvinylalcohol, polyesters, polystyrene, and the like. However, polyester films are preferred while polyethyleneterephthalate film is the most preferred support film. Furthermore, the backing sheet can be dyed with a transparent dyestuff on the surface or throughout the mass. The adhesion of the opaque layer to the backing sheet can be improved by using an anchoring layer, e.g., acrylic resin with the backing sheet or by subjecting the backing sheet to corona discharge. These and other suitable techniques are well known in the art.

The opaque coating is deposited on the transparent backing sheet at a rate of, on a dry matter basis, from about 6 to 20 $g/m^2$, preferably from 8 to 14 $g/m^2$. The thickness of the opaque coating layer should be at most 25 microns, preferably, no more than about 20 microns, since for greater thicknesses it becomes difficult to completely transparentize the opaque layer with the writing liquid or heat since the solvent or heat cannot readily penetrate the entire layer.

The opaque coating can also include small amounts of other ingredients without effecting the opacity of the opaque coating nor the transparency of the transparentized coating. For example, optical brighteners in amounts up to 3% by weight of the coating, and inorganic pigments such as silica, $CaCO_3$, $TiO_2$, etc., in amounts of less than about 10% by weight of the total opaque coating, can be used. The coating can also include transparent dyestuff compositions where colored backgrounds are desired.

The recording material of the invention can be used as well with a writing liquid or by action of heat or both, successively. Any of the known solvents for styrene resins can be used in the writing liquid to transparentize the opaque coating layer. Among the solvents, mention can be made of, for example, ketones of the formula $$R-\underset{\underset{O}{\|}}{C}-R^1$$

wherein R and $R^1$ may be the same or different and represent alkyl groups of 1 to 4 carbon atoms, except that R and $R^1$ cannot both be methyl (since acetone is not a solvent for styrene resins); alkyl esters of the formula $$R-\underset{\underset{O}{\|}}{C}-OR^1$$

wherein R and $R^1$ are as defined above; the Cellosolve esters, chlorinated solvents, benzene, toluene, zylene, dimethylformamide, dimethylacetamide, tetrahydrofuran, and the like. Among these, preferred solvents include methylethyl ketone, methylene chloride, toluene, xylene, ethyl acetate, methyl isobutyl ketone and butyl acetate.

As described in my earlier copending application, Ser. No. 912,546, one or more fluoroalkanes can be added to the writing liquid at a weight ratio of solvent to chlorofluoroalkane of from 10:90 to 80:20 to avoid the toxicity, flammability and/or malodor which may be associated with any of these solvents. The relevant disclosure of my earlier application is incorporated herein, by reference, so as not to unnecessarily expand this description.

When it is desired to prepare transparent markings having a particular color, it is possible to mix a dye of the desired hue in the writing liquid. Dyes sold under the trademarks NEOZAPON (products of the BASF Company) and CERES (products of the Bayer Company) can be mentioned as dyes which easily mix with most of the solvents for styrene resins and which are dyes for styrene resins and which will not adversely effect the desired characteristics of the writing liquid or transparentized recording material.

The opaque recording material of the invention can also be used in the same manner as conventional heat sensitive recording papers, such as those described, for example, in the above-mentioned patents to Grupe, Bourgeois, Echeagaray and Bollinger, et al., including heated stylus, infrared heat, etc. machines, of which the series of Thermofax machines of the 3M company are exemplary. A particularly good general description of "back-printing" and "front-printing" by infrared radiation (thermocopying) as well as printing with heated stylus is provided in the Bollinger, et al. U.S. Pat. No. 3,180,752 and the patents mentioned therein.

While the opaque recording material of this invention can be printed by conventional techniques with thermocopying apparatus, e.g., "Thermofax Secretary 45" of the 3M Company, it can also be used with the transparent backing support of the opaque recording material in contact with the original. After the original is copied onto the recording material, the copy can, for example, be used in overhead projection. It is also possible to add new information to the copy simply by writing on the remaining opaque zones of the opaque coating layer, (i.e., the zones which have not been transparentized by heating) with a suitable writing liquid as described above.

The opaque coating layer of the invention becomes transparent when heated to a temperature between about 100° and 130° C. In some cases, however, it may be useful to lower this temperature by adding from about 5 to 15% by weight of a plasticizer, based on the weight of the styrene resin pigment. This plasticizer is preferably selected among products which do not modify the properties of the coating composition when using it with a writing liquid.

Usable plasticizers include the polycondensed type polyester plasticizers such as dibutyl phthalate, dibutylhexyl phthalate, dioctyl phthalate, dibutylsebacate, dioctylsebacate, diethylhexyladipate, dioctyladipate, etc. The plasticizers are preferably selected from phthalic acid esters and/or adipic acid esters. The most preferable plasticizers include dibutyl phthalate, dibutylhexylphthalate and diethylhexyladipate. By varying the weight of plasticizer within the above limits, the temperature of transparentization can be lowered by as much as 45° or more to temperatures in the range of about 65° to 85° C.

The following non-limiting examples are presented to provide a better understanding of the present invention.

When transparentizing the opaque layer by application of infrared heat the recording material may be directly contacted with an original having both infrared absorbing (black) zones and non-infrared absorbing (e.g., white) zones. When the original is exposed to IR rays, the dark colored zones absorb the rays and become sufficiently hot to raise the temperature of the portions of the opaque layer in contact with the dark zones to the transparentizing temperature. In the light colored non-IR absorbing zones of the original, the IR rays pass through the original and through the opaque recording material which is of a white or milky color and non-absorbent to IR rays. Accordingly, the portions of the opaque layer in contact with the light zones of the original remain opaque while the remaining portions which are in contact with the IR absorbing zones of the original are heated and transparentized. IR rays having wavelengths in the range of 1–3 microns are generally preferred and are those conventionally used in infrared heat machines. Furthermore, after separation of the original and recording material, it is possible to add information by writing on the remaining opaque layers using a writing liquid containing a solvent for the styrene resin pigment, and optionally, a transparent dye.

As noted above, the heat for transparentizing the opaque layer, whether generated by a heated stylus, infrared heat, or other heating means, can be applied to the transparent backing if it is heat conductive or directly to the opaque layer. The latter technique is preferred when writing with a heated stylus while the former is generally preferred when using infrared heat to reproduce an original with infrared absorbing zones.

EXAMPLE 1

The following composition is deposited at a rate of 10 $g/m^2$ on a transparent polyethylene terephthalate film, with a thickness of 75 microns and coated with an anchoring layer:

Rhodopas S 051 (aqueous dispersion, 50% dry solids polystyrene 0.5 microns particles, avg., of the Societe Rhone Poulenc): 10 g Ixan 91 C (55% dry aqueous dispersion PVDC of the Solvay Company): 3 g The mixture is dried gently at 90° C. to form the opaque coating layer having an opacity of 60% measured with a Photovolt type 670 reflectometer. This recording material is written on with a tubular point pen sold under the tradename STAEDTLER type Mars 707 K, filled with methyl ethyl ketone. A perfectly transparent line is obtained which, on overhead projection, is white on a black background.

By adding a blue dye, such as NEOZAPON Blue, to the solvent, a blue line on a black background is obtained directly. When the NEOZAPON Blue is replaced with yellow organol PC, sold by the Ugine Kuhlmann Company, a yellow line is obtained.

The same results are obtained when the methyl ethyl ketone is replaced by methyl isobutyl ketone, ethyl acetate, butyl acetate, toluene, methylene chloride or xylene.

When using a "Thermofax Secretary 45" of the 3M Company, a very good reproduction of the original is obtained at about 120° C.

EXAMPLE 2

On a 50 micron polyester film is deposited a mixture of:

Pliolite Latex 151 (Goodyear styrene-butadiene copolymer): 10 g

Diofan 3033 (PVDC of BASF): 3 g

After drying, a product fairly equivalent to that described in Example 1 is obtained.

For solvent writing, it is possible to operate exactly as in Example 1; by providing the body of a writing felt of the ONYX MARKER type of the Baignol and Farjon Company with any of the solvents cited in Example 1 equivalent results are obtained, except the width of the writing is larger. Similarly, good transparent lines are obtained by writing with a heated stylus or by using a thermocopying machine as in Example 1.

EXAMPLE 3

To the composition of Example 1, 1 g of dibutylphthalate is added. The mixture is then deposited and dried as in Example 1. When using the writing liquid of Example 1, the same results are obtained. However, by applying heat locally on the recording material, a prefectly transparent trace is obtained at about 80° C.

EXAMPLES 4–7

The opaque recording material described in Example 1 is written on with one of the writing liquids shown in Table 1 and the maximum passing speed is measured. The maximum passing speed (cm/sec) of the support is defined as the maximum speed of the pen over the opaque coating layer which gives a transparency of the line equal to that of the uncoated support, measured on a photovolt reflectometer.

TABLE 1

| Example No. | Writing liquid used | Maximum passing speed of the writing support (cm/sec) |
|---|---|---|
| 4 | Methylene chloride | 3.33 |
| 5 | Methyl ethyl ketone | 20 |
| 6 | Toluene | 24 |
| 7 | Xylene | 30 |

Since some of these solvents can evaporate too quickly, it is quite evident that is is possible to add the necessary additive to avoid this drawback. For example, by way of non-limiting example, there can be cited glycerin, ethylene, ethylene glycol, etc.

EXAMPLE 8 and COMPARATIVE EXAMPLES 1–3

These comparative examples clearly show the criticality of the compositions of the opaque coating layer of the opaque recording material of the invention. Different polystyrene pigment-containing coating compositions, as shown in Table 3 are coated on a transparent polyester backing as described in Example 1.

Traces 3 cm wide are made with a paint brush on each sample. These traces are made very slowly to try to obtain the best transparency of the trace as possible with the different writing liquid solvents shown in Table 2. The transparency of the trace ("Haze value") was thereafter measured with a well-known Gardner Hazemeter (ASTM D 1003-61). The writing liquids were chosen from among those well known as good solvents of of polystyrene resin, see, e.g., *Handbook of Polymer Science and Technology*.

TABLE 2

| Type of Solvent | Weight of polystyrene soluble in 100 g of solvent |
|---|---|
| Toluene | 90 g |
| Methylethylketone | 90 g |
| Ethylacetate | 90 g |
| Tetrahydrofuran | 90 g |
| Methylenechloride | 80 g |

Each of the samples is prepared as described in Example 1 with composition based on 10 g of polystyrene resin of 0.5μ average particle diameter (styrofan 2D of BASF Company) and 3 g of the film forming binder resin shown in Table 3.

The sample of Comparative Example 3 is the commercial product Thermofax Trannsparency No. 528 of the 3 M Company.

On each of these four samples, traces are made as previously described with each of the five solvents shown in Table 2, and the haze value is measured in each case. The haze value of the uncoated polyester film of Example 8 and Comparative Examples 1 and 2 is measures as 2.4. The following results are obtained.

TABLE 3

| Example No. Ex = Example CE = Comparative Example | Film forming binder resin | Haze Value Methylethyl ketone | Ethylacetate | Toluene | Methylene chloride | Tetrahydro furan |
|---|---|---|---|---|---|---|
| Ex. 8 | polyvinylidene chloride | 3.0 | 3.6 | 5.2 | 5.1 | 20 |
| CE 1 | polyvinyl chloride (LUTOFAN 200D BASF Co. | 78 | 49.4 | 30.5 | 20 | 55.9 |
| CE 2 | acrylic resin (Neocryl CC6 of polyvinyl Chemie) | 62.9 | 42 | 44.8 | 36.6 | 71.8 |
| CE 3 | 3M commercial product ref. 528 | 81.7 | 47 | 84.8 | 56.7 | 50.2 |

EXAMPLE 9 and COMPARATIVE EXAMPLES 4-6

The four samples of example 8 and comparative examples 1-3, respectively, are tested to determine their ability to be transparentized by applying heat. These tests are made in an oven at 130° C. for 30 seconds. The haze value was measured as described above.

TABLE 4

| Example No. | Film forming binder resin | Haze Value |
|---|---|---|
| 9 | PVDC | 3.6 |
| CE 4 | Polyvinyl chloride (LUTOFAN 200D) | 21.2 |
| CE 5 | Acrylic resin (Neocryl CC6) | 10.4 |
| CE 6 | 3M commercial product ref. 528 | — |

The haze value of the 3M commercial product, ref. 528, could not be measured under the conditions defined above since it completely shrinks.

Examples 8 and 9 clearly show the unexpected superiority of the recording material of the invention as compared to materials obtained with other conventional film forming resin binders. This superiority is evident in both modes of writing, solvent and heat.

What is claimed is:

1. An opaque recording material for making transparencies for projection of information or for making photographic negatives for reproduction, said recording material comprising a transparent support coated with an opaque layer obtained from a mixture of an organic styrene resin pigment emulsion and a polyvinylidene chloride film-forming resin binder.

2. The opaque recording material according to claim 1 wherein the weight ratio of styrene resin pigment to film-forming resin binder is in the range of 1:1 to 9:1.

3. The opaque recording material according to claim 1 or 2 wherein the styrene resin pigment has an average particle diameter size range of from about 0.2 micron to about 1.0 micron.

4. The opaque recording material according to claim 1 or 2 in which the styrene resin pigment is selected from the group consisting of polystyrene homopolymers and styrene copolymers containing at least 70% by weight of styrene units and up to 30% by weight of another vinyl monomer copolymerizable with styrene.

5. The opaque recording material according to claim 3 in which the styrene resin pigment is selected from the group consisting of polystyrene homopolymers and styrene copolymers containing at least 70% by weight of styrene units and up to 30% by weight of another vinyl monomer copolymerizable with styrene.

6. The opaque recording material according to claim 1 or 2 which further comprises from 5% to 15% by weight of a plasticizer, based on the weight of the styrene resin pigment.

7. The opaque recording material according to claim 4 which further comprises from 5% to 15% by weight of a plasticizer, based on the weight of the styrene resin pigment.

8. The opaque recording material according to claim 6 wherein said plasticizer is at least one member selected from the group consisting of esters of phthalic acid and esters of adipic acid.

9. The opaque recording material according to claim 7 wherein said plasticizer is at least one member selected from the group consisting of esters of phthalic acid and esters of adipic acid.

10. The opaque recording material according to claim 8 wherein said plasticizer is selected from the group consisting of dibutylphthalate, diethylhexylphthalate and diethylhexyladipate.

11. The opaque recording material according to claim 9 wherein said plasticizer is selected from the group consisting of dibutylphthalate, diethylhexylphthalate and diethylhexyladipate.

12. The opaque recording material according to claim 1 in which the support is a polyester film.

13. A process for making transparencies for projection of information or for making photographic negatives for reproductions which comprises applying heat to the opaque recording material of claim 1, the amount of heat being sufficient to raise the temperature of the opaque layer above its transparentizing temperature.

14. The process according to claim 13 wherein the opaque layer further comprises from 5% to 15% by weight of a plasticizer, based on the weight of the styrene resin pigment.

15. A process for making transparencies for recording of information which can be used for projection or reproduction by transparentizing portions of an opaque recording medium by application of heat and transparentizing other portions of the opaque recording medium by application of writing liquid, said process comprising applying heat and writing liquid in selectively different areas to the surface of the opaque layer of the opaque recording material of claim 1, said writing liquid comprising a solvent for the styrene resin pigment and the amount of heat being sufficient to raise the temperature of the opaque layer to above its transparentizing temperature.

16. The process of claim 15 wherein the step of applying heat is carried out prior to the step of applying writing liquid, which comprises placing an original having infrared absorbing zones thereon in contact with the opaque recording material, exposing the original to irradiation with infrared rays to heat the infrared absorbing zones of the original allowing the temperature of the portions of the opaque layer of the opaque recording material, which are in contact with the infrared absorbing zones of the original to increase to at least its transparentizing temperature, separating the original and opaque recording material, and applying said writing liquid to selected areas of the remaining opaque zones of the opaque layer.

17. The opaque recording material according to claims 1 or 2 wherein the opaque layer has a degree of opacity of at least 60% and said transparencies which are formed by applying a solvent for the styrene resin pigment to the opaque layer or by raising the temperature of the opaque layer to above its transparentizing temperature have a degree of transparency of at least 90%.

18. The opaque recording material according to claim 3 wherein the opaque layer has a degree of opacity of at least 60% and said transparencies which are formed by applying a solvent for the styrene resin pigment to the opaque layer or by raising the temperature of the opaque layer to above its transparentizing temperature have a degree of transparency of at least 90%.

* * * * *